US009203543B2

(12) United States Patent
Presi et al.

(10) Patent No.: US 9,203,543 B2
(45) Date of Patent: Dec. 1, 2015

(54) PASSIVE OPTICAL NETWORKS

(75) Inventors: Marco Presi, Peccioli (IT); Ernesto Ciaramella, Rome (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 110 days.

(21) Appl. No.: 13/824,869

(22) PCT Filed: Nov. 19, 2010

(86) PCT No.: PCT/EP2010/067826
§ 371 (c)(1),
(2), (4) Date: Nov. 18, 2013

(87) PCT Pub. No.: WO2012/034604
PCT Pub. Date: Mar. 22, 2012

(65) Prior Publication Data
US 2014/0064727 A1 Mar. 6, 2014

(30) Foreign Application Priority Data

Sep. 16, 2010 (EP) .................................. 10177140

(51) Int. Cl.
*H04J 14/02* (2006.01)
*H04J 14/06* (2006.01)
(Continued)

(52) U.S. Cl.
CPC .......... *H04J 14/028* (2013.01); *H04B 10/2572* (2013.01); *H04B 10/2587* (2013.01);
(Continued)

(58) Field of Classification Search
CPC ..... H04J 14/02; H04J 14/028; H04J 14/0282; H04J 14/06; H04J 2014/0253; H04B 10/2572; H04B 10/2587; H04B 10/272
See application file for complete search history.

(56) References Cited

U.S. PATENT DOCUMENTS 8,606,107 B2 * 12/2013 Bai et al. ...................... 398/70
2010/0046950 A1 2/2010 Cao et al.
(Continued)

FOREIGN PATENT DOCUMENTS

WO WO 2009/007973 1/2009
WO WO 2011/018054 2/2011

OTHER PUBLICATIONS

Zhou et al, "A Novel Wavelength Division Multiplexing Passive Optical Network Based on Self-Seeding Light Source and Doubling Wavelength-Utilized Rate", Fiber and Integrated Optics, 29:1, 76-83, 2009.
Arellano et al, "Reflections and Multiple Rayleigh Backscattering in WDM Single-Fiber Loopback Access Networks", Journal of Lightwave Technology, vol. 27, No. 1, pp. 12-18, Jan. 1, 2009.
Van Deventer, "Preservation of Polarisation Orthogonality of Counterpropagating Waves Through Dichroic Birefringent Optical Media: Proof and Application", Electronics Letters, vol. 27, No. 17, pp. 1538-1540, Aug. 15, 1991.
International Search Report for PCT/EP2010/067826 mailed Jun. 15, 2011.
(Continued)

*Primary Examiner* — Leslie Pascal
(74) *Attorney, Agent, or Firm* — Baker Botts, LLP

(57) ABSTRACT

Optical transmitter apparatus 10 comprising a reflective optical amplifier 12, a driver 14, an optical splitter 16, polarisation compensation apparatus 18 and an optical router 20. The reflective optical amplifier is arranged to receive an optical seed signal. The driver is arranged to generate a drive signal arranged to cause the reflective optical amplifier to amplify the optical seed signal to form an optical signal. The optical splitter is arranged to receive the optical signal and to split off a part of the optical signal to form a further optical signal. The polarisation compensation apparatus is arranged to receive the further optical signal and to rotate a polarisation of the further optical signal by a pre-determined amount, to form a further optical seed signal. The optical router is arranged to receive the further optical seed signal and to direct the further optical seed signal to the reflective optical amplifier for amplification thereby.

17 Claims, 16 Drawing Sheets

(51) Int. Cl.
*H04B 10/2507* (2013.01)
*H04B 10/2587* (2013.01)
*H04B 10/272* (2013.01)

(52) U.S. Cl.
CPC .............. *H04B10/272* (2013.01); *H04J 14/02* (2013.01); *H04J 14/0282* (2013.01); *H04J 14/06* (2013.01); *H04J 2014/0253* (2013.01)

(56) References Cited

U.S. PATENT DOCUMENTS

| | | |
|---|---|---|
| 2010/0284693 A1 | 11/2010 | Agmon et al. |
| 2011/0038635 A1 | 2/2011 | Bai |
| 2011/0129227 A1* | 6/2011 | Wen et al. .......... 398/82 |

OTHER PUBLICATIONS

K. Cho et al., "Self-Polarization-Stabilization Technique for Long-Reach Coherent WDM PON" Optical Fiber Communication (OFC), Collocated National Fiber Optic Engineers Conference, 2010 Conference on (OFC/NFOEC), IEEE, Mar. 21, 2010, pp. 1-3.

C. Giles, "Suppression of Polarisation Holeburning-Induced Gain Anisotrpy in Reflective EDFA's", Electronics Letters, IEE Stevenage, GB, vol. 30, No. 12, Jun. 9, 1994, pp. 976-977.

E. Wong et al., "Directly Modulated Self-Seeding Reflective Semiconductor Optical Amplifiers as Colorless Transmitters in Wavelength Division Multiplexed Passive Optical Networks", Journal of Lightwave Technology, vol. 25, No. 1, Jan. 2007, 8 pages.

* cited by examiner

PASSIVE OPTICAL NETWORKS

This application is the U.S. national phase of International Application No. PCT/EP2010/067826 filed 19 Nov. 2010 which designated the U.S. and claims priority to EP 10177140.0 filed 16 Sep. 2010, the entire contents of each of which are hereby incorporated by reference.

TECHNICAL FIELD

The invention relates to an optical transmitter apparatus, a passive optical network remote node, an optical network element and a passive optical network. The invention also relates to a method of forming an optical signal.

BACKGROUND

Efficient deployment of wavelength division multiplexed passive optical networks (WDM-PON) is tightly bound to the availability of colourless transceivers, i.e. terminals that can be operated transparently to the WDM channels. As common photo-receivers have an almost flat response in the 1300-1500 nm window, the implementation of colourless terminals is focused on the realization of colourless transmitters.

Directly modulated self-seeded reflective semiconductor optical amplifiers (R-SOA) have been proposed as uplink transmitters for use in WDM-PONs. One proposed colourless transmitter based on R-SOAs exploits a mirror shared by all the optical network units (ONU) in a WDM-PON (Wong et al, Directly Modulated Self-Seeding Reflective Semiconductor Optical Amplifiers as Colorless Transmitters in Wavelength Division Multiplexed Passive Optical Networks, Journal of Lightwave Technology, volume 25, number 1, 2007). For each ONU, the mirror forms a cavity that comprises the R-SOA, the wavelength multiplexer (WDM-MUX) and the drop fibre. Initialization of the self-seeding depends critically on losses introduced by the mirror, the WDM-MUX and the drop fibre. However, the solution proposed by Wong suffers from the problem that the self-seeding is polarization sensitive. Polarization dependency may be a critical parameter if the R-SOAs in the ONUs have a non-negligible Polarization Dependent Gain (PDG); low-cost and uncooled R-SOAs may realistically be expected to exhibit PDG as high as 20 dB. The random polarization fluctuations in the drop fibre may also have a significant effect.

SUMMARY

It is an object to provide an improved optical transmitter apparatus. It is a further object to provide an improved passive optical network remote node. It is a further object to provide an improved optical network element. It is a further object to provide an improved passive optical network. It is a further object to provide an improved method of forming an optical signal.

A first aspect of the invention provides optical transmitter apparatus comprising a reflective optical amplifier, a driver, an optical splitter, polarisation compensation apparatus and an optical router. The reflective optical amplifier is arranged to receive an optical seed signal. The driver is arranged to generate a drive signal arranged to cause the reflective optical amplifier to amplify the optical seed signal to form an optical signal. The optical splitter is arranged to receive the optical signal and to split off a part of the optical signal to form a further optical signal. The polarisation compensation apparatus is arranged to receive the further optical signal. The polarisation compensation apparatus is further arranged to rotate a polarisation of the further optical signal by a predetermined amount, to form a further optical seed signal. The optical router is arranged to receive the further optical seed signal and to direct the further optical seed signal to the reflective optical amplifier for amplification thereby.

An optical transmitter apparatus may thereby be provided which is self-seeding and in which the polarization of a seed signal may be controlled. This may reduce a polarization dependency of the optical transmitter apparatus and may allow polarization fluctuations occurring between the reflective optical amplifier and the optical splitter or optical router to be compensated for. Controlling the polarization of the seed signal may improve operation of the reflective optical amplifier.

In an embodiment, the polarisation compensation apparatus comprises a Faraday rotator mirror. Using a Faraday rotator mirror may ensure that the optical seed signal has an orthogonal polarization state to the optical signal. Any polarisation fluctuations experienced by the optical signal will occur on a time scale which is far slower than a time of flight of the optical signal and the further optical seed signal, therefore every second further optical seed signal will have the same polarization state, regardless of polarization fluctuations experienced during transmission. The self-seeding process may be optimised as a result of every second optical seed signal having the same polarisation state.

In an embodiment, the polarisation compensation apparatus further comprises an optical amplifier arranged to amplify one of the further optical signal and the further optical seed signal. Providing an optical amplifier may enable a reflective optical amplifier having a lower saturated gain to be used.

In an embodiment, the polarisation compensation apparatus comprises a polarisation compensator arranged to rotate the polarisation by 90 degrees. This may ensure that during the each roundtrip, the light retraces its optical path with an orthogonal polarization state. The optical transmitter apparatus will experience polarisation fluctuations on a time scale which is far slower than the roundtrip time, therefore every two roundtrips light will re-enter the reflective optical amplifier with the same polarization state, regardless of polarization fluctuations in the optical transmitter apparatus. The self-seeding process may be optimised as a result of every second optical seed signal having the same polarisation state.

In an embodiment, the optical router comprises an optical multiplexer/demultiplexer comprising a plurality of ports. The optical transmitter apparatus comprises a said plurality of reflective optical amplifiers and a said plurality of drivers. Each reflective optical amplifier is coupled to a respective port of the optical multiplexer/demultiplexer. Each reflective optical amplifier is arranged to receive a respective optical seed signal. Each driver is arranged to generate a respective drive signal arranged to cause the respective reflective optical amplifier to amplify the respective optical seed signal to form a respective optical signal.

The polarization compensation apparatus may be used to control the polarization of a plurality of optical signals.

In an embodiment, each optical signal has a different wavelength.

In an embodiment, the reflective optical amplifier comprises a reflective semiconductor optical amplifier.

In an embodiment, the driver is further arranged to receive traffic to be transmitted and the drive signal is further arranged to cause the reflective semiconductor optical amplifier to apply the traffic to the optical seed signal to form a traffic carrying optical signal.

In an embodiment, the optical splitter comprises an optical coupler. In an embodiment, the coupler has a 99:1 coupling ratio. In an embodiment, the optical router comprises said optical coupler. In an embodiment, the optical multiplexer/demultiplexer comprises an arrayed waveguide grating.

A second aspect of the invention provides a passive optical network remote node comprising an optical splitter, polarisation compensation apparatus, an optical output and an optical router. The optical splitter is arranged to receive an upstream optical signal and to split off a part of the optical signal to form a further optical signal. The polarisation compensation apparatus is arranged to receive the further optical signal. The polarisation compensation apparatus is further arranged to rotate a polarisation of the further optical signal by a pre-determined amount, to form an optical seed signal. The optical router is arranged to receive the optical seed signal and to route the optical seed signal to the optical output.

The passive optical network remote node may control the polarization of the seed signal. This may reduce a polarization dependency of reflective optical amplifier arranged to receive the seed signal and may allow polarization fluctuations experienced by the upstream optical signal to be compensated for. Controlling the polarization of the seed signal may improve operation of a reflective optical amplifier arranged to receive the seed signal.

In an embodiment, the polarisation compensation apparatus comprises a Faraday rotator mirror. Using a Faraday rotator mirror may ensure that the optical seed signal has an orthogonal polarization state to the upstream optical signal. Any polarisation fluctuations experienced by the upstream optical signal will occur on a time scale which is far slower than a time of flight of the upstream optical signal to the node and the time of flight of the seed signal from the node to a remote optical network unit, therefore every second seed signal will have the same polarization state, regardless of polarization fluctuations experienced during transmission.

In an embodiment, the polarisation compensation apparatus further comprises an optical amplifier arranged to amplify one of the further optical signal and the optical seed signal. The remote node may therefore be used with lower optical power upstream optical signals.

In an embodiment, the polarisation compensation apparatus comprises a polarisation compensator arranged to rotate the polarisation by 90 degrees.

In an embodiment, the optical splitter is arranged to receive a plurality of upstream optical signals and to split off a part of each said optical signal to form a respective further optical signal. The polarisation compensation apparatus is arranged to receive each further optical signal. The polarisation compensation apparatus is further arranged to rotate a polarisation of each further optical signal by a pre-determined amount, to form a respective optical seed signal. The optical router comprises an optical multiplexer/demultiplexer comprising a first port coupled to the optical splitter and a said plurality of further ports. Each further port is arranged to deliver a respective optical seed signal. The polarization compensation apparatus may be used to control the polarization of a plurality of optical seed signals.

In an embodiment, each upstream optical signal has a different wavelength.

In an embodiment, the optical splitter comprises an optical coupler. In an embodiment, the coupler has a 99:1 coupling ratio. In an embodiment, the optical router comprises said optical coupler. In an embodiment, the optical multiplexer/demultiplexer comprises an arrayed waveguide grating.

A third aspect of the invention provides an optical network element comprising optical transmitter apparatus. The optical transmitter apparatus comprises a reflective optical amplifier, a driver, an optical splitter, polarisation compensation apparatus and an optical router. The reflective optical amplifier is arranged to receive an optical seed signal. The driver is arranged to generate a drive signal arranged to cause the reflective optical amplifier to amplify the optical seed signal to form an optical signal. The optical splitter is arranged to receive the optical signal and to split off a part of the optical signal to form a further optical signal. The polarisation compensation apparatus is arranged to receive the further optical signal. The polarisation compensation apparatus is further arranged to rotate a polarisation of the further optical signal by a pre-determined amount, to form a further optical seed signal. The optical router is arranged to receive the further optical seed signal and to direct the further optical seed signal to the reflective optical amplifier for amplification thereby.

An optical network element may thereby be provided which is self-seeding and in which the polarization of a seed signal may be controlled. This may reduce a polarization dependency of the optical transmitter apparatus and may allow polarization fluctuations occurring between the reflective optical amplifier and the optical splitter or optical router to be compensated for. Controlling the polarization of the seed signal may improve operation of the reflective optical amplifier.

In an embodiment, the polarisation compensation apparatus comprises a Faraday rotator mirror. Using a Faraday rotator mirror may ensure that the further optical seed signal has an orthogonal polarization state to the optical signal. The optical transmitter apparatus will experience polarisation fluctuations on a time scale which is far slower than the time of flight of the optical signal and the further optical seed signal, therefore every second further optical seed signal will enter the reflective optical amplifier with the same polarization state, regardless of polarization fluctuations in the optical transmitter apparatus. The self-seeding process may be optimised as a result of every second optical seed signal having the same polarisation state.

In an embodiment, the polarisation compensation apparatus further comprises an optical amplifier arranged to amplify one of the further optical signal and the further optical seed signal. Providing an optical amplifier may enable a reflective optical amplifier having a lower saturated gain to be used.

In an embodiment, the polarisation compensation apparatus comprises a polarisation compensator arranged to rotate the polarisation by 90 degrees.

In an embodiment, the optical router comprises an optical multiplexer/demultiplexer comprising a plurality of ports. The optical transmitter apparatus comprises a said plurality of reflective optical amplifiers and a said plurality of drivers. Each reflective optical amplifier is coupled to a respective port of the optical multiplexer/demultiplexer. Each reflective optical amplifier is arranged to receive a respective optical seed signal. Each driver is arranged to generate a respective drive signal arranged to cause the respective reflective optical amplifier to amplify the respective optical seed signal to form a respective optical signal.

The polarization compensation apparatus may be used to control the polarization of a plurality of optical seed signals.

In an embodiment, each optical signal has a different wavelength.

In an embodiment, the reflective optical amplifier comprises a reflective semiconductor optical amplifier.

In an embodiment, the driver is further arranged to receive traffic to be transmitted and the drive signal is further arranged to cause the reflective semiconductor optical amplifier to apply the traffic to the optical seed signal to form a traffic carrying optical signal.

In an embodiment, the optical splitter comprises an optical coupler. In an embodiment, the coupler has a 99:1 coupling ratio. In an embodiment, the optical router comprises said optical coupler. In an embodiment, the optical multiplexer/demultiplexer comprises an arrayed waveguide grating.

A fourth aspect of the invention provides a passive optical network comprising an optical network unit, a remote node and a drop fibre coupled between the optical network unit and the remote node. The optical network unit comprises a reflective optical amplifier and a driver. The reflective optical amplifier is arranged to receive an optical seed signal. The driver is arranged to generate a drive signal arranged to cause the reflective optical amplifier to amplify the optical seed signal to form an optical signal. The remote node comprises an optical splitter, polarisation compensation apparatus and an optical router. The optical splitter is arranged to receive the optical signal and to split off a part of the optical signal to form a further optical signal. The polarisation compensation apparatus is arranged to receive the further optical signal. The polarisation compensation apparatus is further arranged to rotate a polarisation of the further optical signal by a pre-determined amount, to form a further optical seed signal. The optical router is arranged to receive the further optical seed signal and to direct the further optical seed signal to the reflective optical amplifier.

The passive optical network may thereby be self-seeding and the polarization of the seed signals may be controlled. This may reduce a polarization dependency of the reflective optical amplifier and may allow polarization fluctuations occurring within the passive optical network to be compensated for. Controlling the polarization of the seed signal may improve operation of the reflective optical amplifier.

In an embodiment, the polarisation compensation apparatus comprises a Faraday rotator mirror. Using a Faraday rotator mirror may ensure that during transmission of each optical signal and further optical seed signal, the light retraces its optical path across the passive optical network with an orthogonal polarization state. The drop fibre will give rise to polarisation fluctuations on a time scale which is far slower than the transmission time, therefore every second further optical seed signal will re-enter the reflective optical amplifier with the same polarization state, regardless of polarization fluctuations in the drop fibre. The self-seeding process may be optimised as a result of every second optical seed signal having the same polarisation state.

In an embodiment, the polarisation compensation apparatus further comprises an optical amplifier arranged to amplify one of the further optical signal and the further optical seed signal. Providing an optical amplifier may enable a reflective optical amplifier having a lower saturated gain to be used.

In an embodiment, the polarisation compensation apparatus comprises a polarisation compensator arranged to rotate the polarisation by 90 degrees.

In an embodiment, the passive optical network comprises a plurality of optical network units and a said plurality of drop fibres. Each drop fibre is coupled between the remote node and a respective optical network unit. Each optical network unit forms a respective optical signal.

In an embodiment, the optical splitter is arranged to receive a plurality of optical signals and to split off a part of each said optical signal to form a respective further optical signal. The polarisation compensation apparatus is arranged to receive each further optical signal. The polarisation compensation apparatus is further arranged to rotate a polarisation of each further optical signal by a pre-determined amount, to form a respective optical seed signal. The optical router comprises an optical multiplexer/demultiplexer comprising a first port coupled to the optical splitter and a said plurality of further ports. Each further port is arranged to deliver a respective optical seed signal. The polarisation compensation apparatus may be used to control the polarization of a plurality of optical seed signals.

In an embodiment, each optical signal has a different wavelength.

In an embodiment, the optical splitter comprises an optical coupler. In an embodiment, the coupler has a 99:1 coupling ratio.

In an embodiment, the optical multiplexer/demultiplexer comprises an arrayed waveguide grating.

In an embodiment, the reflective optical amplifier comprises a reflective semiconductor optical amplifier.

In an embodiment, each driver is further arranged to receive traffic to be transmitted and the drive signal is further arranged to cause the respective reflective semiconductor optical amplifier to apply the traffic to the respective optical seed signal to form a traffic carrying optical signal.

A fifth aspect of the invention provides a method of forming an optical signal. The method comprises receiving an optical seed signal at a reflective optical amplifier. The optical seed signal is then amplified to form an optical signal. The method further comprises splitting the optical signal to form a further optical signal. The polarisation of the further optical signal is rotated by a pre-determined amount, to form a further optical seed signal. The further optical seed signal is delivered to the reflective optical amplifier for amplification thereby.

An optical signal may thus be formed by self-seeding and the polarization of the seed signal may be controlled. This may reduce a polarization dependency of the reflective optical amplifier and may allow polarization fluctuations experienced by the optical signal to be compensated for. Controlling the polarization of the seed signal may improve operation of the reflective optical amplifier.

In an embodiment, the polarisation is rotated by a Faraday rotator mirror. Using a Faraday rotator mirror may ensure that during transmission of each optical signal and further optical seed signal, the light retraces its optical path with an orthogonal polarization state. The polarisation fluctuations experienced by the optical signal will occur on a time scale which is far slower than the transmission time, therefore every second further optical seed signal will re-enter the reflective optical amplifier with the same polarization state, regardless of polarization fluctuations. The self-seeding process may be optimised as a result of every second optical seed signal having the same polarisation state.

In an embodiment, the polarisation is rotated by a polarisation compensator arranged to rotate the polarisation by 90 degrees.

In an embodiment, the reflective optical amplifier comprises a reflective semiconductor optical amplifier.

In an embodiment, the method comprises receiving a plurality of optical seed signals at a said plurality of reflective optical amplifiers. Each optical seed signal is then amplified to form a respective optical signal. The method further comprises splitting each optical signal to form a respective further optical signal. The polarisation of each further optical signal is rotated by a pre-determined amount, to form a said plurality of further optical seed signals. The further optical seed signals are delivered to the respective reflective optical amplifier for amplification thereby. The method may be used to control the polarization of a plurality of further optical seed signals.

In an embodiment, each optical signal has a different wavelength.

A sixth aspect of the invention provides a data carrier having computer readable instructions embodied therein. The said computer readable instructions are for providing access to resources available on a processor. The computer readable instructions comprise instructions to cause the processor to perform any of the above steps of the method of forming an optical signal.

Embodiments of the invention will now be described, by way of example only, with reference to the accompanying drawings.

DETAILED DESCRIPTION

Figure 1:
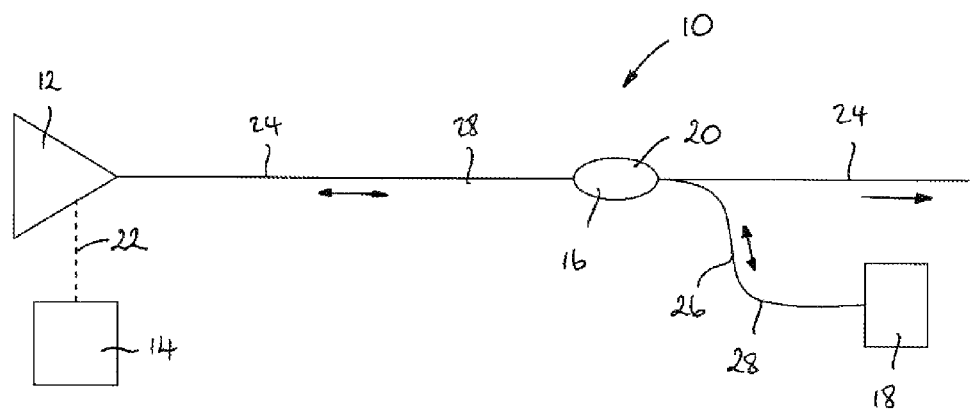
FIG. 1 is a schematic representation of optical transmitter apparatus according to a first embodiment of the invention.

Referring to FIG. 1, a first embodiment of the invention provides optical transmitter apparatus 10 comprising a reflective optical amplifier 12, a driver 14, an optical splitter 16, polarisation compensation apparatus 18 and an optical router 20.

The reflective optical amplifier 12 is arranged to receive an optical seed signal. The driver 14 is arranged to generate a drive signal 22 arranged to cause the reflective optical amplifier 12 to amplify the optical seed signal to form an optical signal 24. The optical splitter 16 is arranged to receive the optical signal 24 and to split off a part of the optical signal to form a further optical signal 26. The polarisation compensation apparatus 18 is arranged to receive the further optical signal 26. The polarisation compensation apparatus 18 is arranged to rotate a polarisation of the further optical signal 26 by a predetermined amount, to form a further optical seed signal 28. The optical router 20 is arranged to receive the further optical seed signal 28 and to direct the further optical seed signal 28 to the reflective optical amplifier 12 for amplification.

In this example, the polarisation compensation apparatus 18 comprises a Faraday rotator mirror (FRM).

In use, the reflective optical amplifier receives an optical seed signal and is driven by the drive signal 22 to amplify the optical seed signal to form an optical signal 24. The optical signal is received by the optical splitter 16 and part of the optical signal 24 is split off to form a further optical signal 26. The further optical signal 26 is received by the FRM 18, which rotates the polarisation of the further optical signal and reflects it, to form the further optical seed signal. As will be well known to the person skilled in the art, an FRM rotates an optical signal by 45° on a first pass through the faraday rotator, reflects the optical signal at the mirror and rotates the optical signal by a further 45° on the second pass through the faraday rotator, to produce a total polarisation rotation of 90°.

The optical transmitter apparatus 10 is arranged to form an optical signal at a wavelength within a transmission bandwidth. In this example, the transmission bandwidth comprises the telecommunications C-band (1530-1565 nm). The FRM 18 is arranged to rotate the polarisation of the further optical signal by 90° at wavelengths across the whole transmission bandwidth. The transmission bandwidth may alternatively comprise the telecommunications L-band (1565-1625 nm), with the FRM 18 being arranged to operate at those wavelengths.

The optical router 20 directs the further optical seed signal 28 to the reflective optical amplifier 12 for amplification. The initial optical seed signal may be provided from the FRM 18, as described, or it may comprise amplified spontaneous emission (ASE) noise within the reflective optical amplifier 12.

The optical transmitter apparatus 10 may provide a self-tunable laser source suitable for WDM-PON operations at very low cost. As discussed in more detail later, the optical transmitter apparatus may work transparently across the full C-band or L-band. It may solve the problem of power penalties associated with uncontrollable reflections generated through the feeder fibre in a WDM-PON. Indeed, every reflection is beneficial to the self-seeding, and therefore improves the transmission performance.

Figure 2:
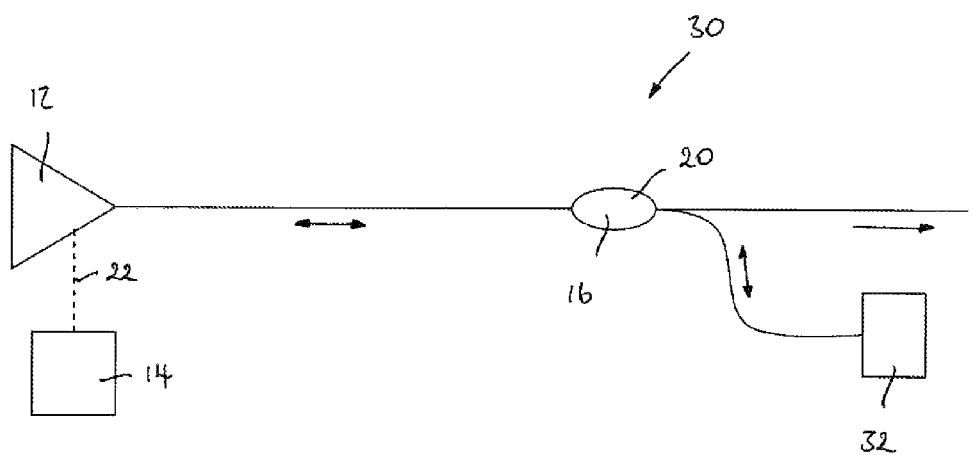
FIG. 2 is a schematic representation of optical transmitter apparatus according to a second embodiment of the invention.

A second embodiment of the invention provides optical transmitter apparatus 30, as shown in FIG. 2. The optical transmitter apparatus 30 of this embodiment is similar to the optical transmitter apparatus 10 of FIG. 1, with the following modification. The same reference numbers are retained for corresponding features.

Figure 3:
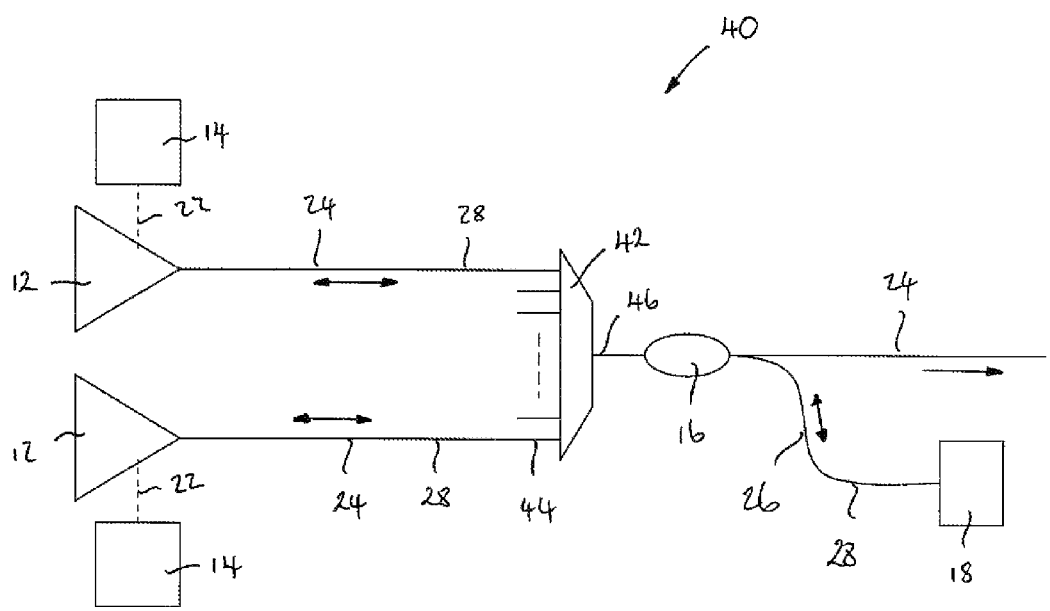
FIG. 3 is a schematic representation of optical transmitter apparatus according to a third embodiment of the invention.

In this embodiment, the polarisation compensation apparatus comprises a polarisation compensator 32 arranged to rotate the polarisation of the further optical signal by 90°, to form the further optical seed signal. The polarisation compensator 32 is arranged to rotate the polarisation of the further optical signal by 90°+/−1° at wavelengths across the whole transmission bandwidth. FIG. 3 shows optical transmitter apparatus 40 according to third embodiment of the invention. The optical transmitter apparatus 40 is similar to the optical transmitter apparatus 10 of FIG. 1, with the following modifications. The same reference numbers are retained for corresponding features.

In this embodiment, the optical splitter 16 comprises an optical coupler having a 99:1 splitting ratio, such that the further optical signal 26 comprises one percent of the optical signal 24. The reflective optical amplifier 12 comprises a reflective semiconductor optical amplifier (RSOA).

The optical transmitter 40 of this embodiment is an all-fibre device.

The optical router comprises an optical multiplexer/demultiplexer (MUX) 42. The MUX 42 comprises a plurality of ports 44, 46. The optical transmitter apparatus 40 comprises a plurality of reflective optical amplifiers 12 and a corresponding plurality of drivers 14, each arranged to generate a respective drive signal 22. Each optical amplifier 12 is coupled to a respective port 44 on one side of the MUX 42 and the port 46 on the other side of the MUX 42 is coupled to the optical splitter 16. The optical splitter 16 is arranged to receive the said plurality of optical signals and to split of a part of each optical signal to form a said plurality of further optical signals.

The FRM 18 receives and rotates the polarisation of each of the said plurality of further optical signals 26 to form a said plurality of further optical seed signals 28.

The optical transmitter 40 comprises an all-optical circuit, in which the FRM 18 is shared by all the RSOAs 12. The optical transmitter 40 may be operated in a fully colourless and polarization independent manner. The self-seeding process may be maximized by providing that every second further optical seed signal (seed signal) enters the R-SOA 12 with the same initial polarization. The FRM 18 ensures that during each roundtrip, from R-SOA 12 to FRM 18 and back, the further optical seed signal retraces a cavity comprising the coupler 16, MUX 42, and connecting optical fibres, with an orthogonal polarization state. This holds because the polarization transfer matrix of the cavity changes on a time scale which is far slower than the roundtrip time. Therefore every two roundtrips, an (further) optical seed signal enters the R-SOA with the same polarization state, regardless of temporal changes of the polarization transfer matrix.

Using an FRM 18 may compensate for residual polarisation dependent gain of the RSOA 12. This may provide error-free operation regardless of random polarisation fluctuations.

The optical transmitter apparatus 40 may provide a simple, passive colourless transmitter in which polarisation effects on self-seeding are minimized, and the performance of the RSOA 12 may therefore be optimised across the whole C-band.

Figure 4:
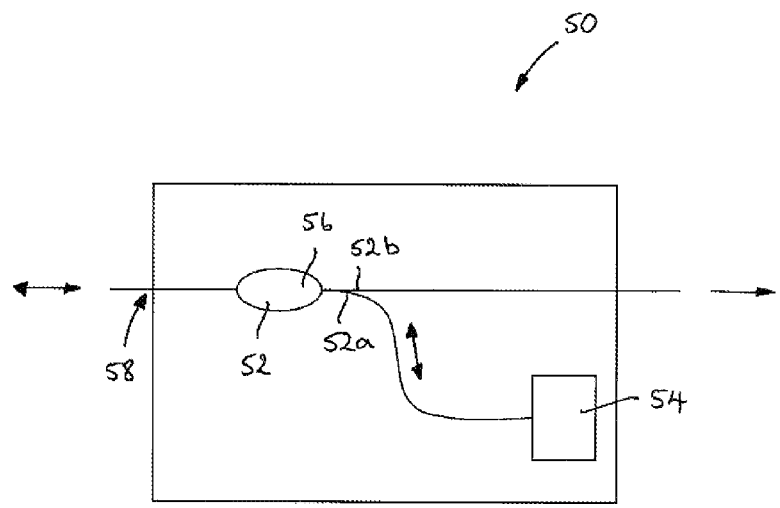
FIG. 4 is a schematic representation of a passive optical network remote node according to a fourth embodiment of the invention.

A fourth embodiment of the invention provides a passive optical network (PON) remote node 50, as shown in FIG. 4. The remote node 50 comprises an optical splitter 52, polarisation compensation apparatus 54, an optical router 56 and an optical output 58.

The optical splitter 52 is arranged to receive an upstream optical signal and to split off a part of the optical signal to form a further optical signal. The polarisation compensation apparatus 54 is arranged to receive the further optical signal. The polarisation compensation apparatus 54 is arranged to rotate a polarisation of the further optical signal by a predetermined amount, to form an optical seed signal. The optical router 56 is arranged to receive the optical seed signal and to route it to the optical output 58.

In this example, the polarisation compensation apparatus 54 comprises a faraday rotator mirror (FRM). The FRM 54 is arranged to rotate the polarisation of the further optical signal and to reflect the further optical signal to form the optical seed signal.

In use, an upstream optical signal is received at the optical splitter 52 of the remote node 50. The optical splitter 52 splits off a part of the optical signal to form a further optical signal, which is output at first port 52a of the optical splitter, with the remainder of the upstream optical signal output at second port 52b of the optical splitter. The FRM 54 is arranged to receive the further optical signal from the optical splitter 52. The FRM 54 is arranged to rotate the polarisation of the further optical signal by a predetermined amount and to reflect the further optical signal, to form an optical seed signal. The optical seed signal is routed by the optical router 56 to the optical output 58, for onward downstream transmission.

Figure 5:
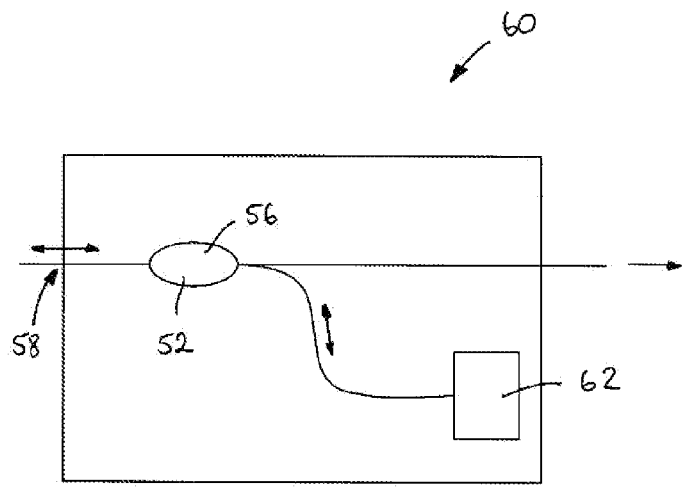
FIG. 5 is a schematic representation of a passive optical network remote node according to a fifth embodiment of the invention.

A fifth embodiment of the invention provides a PON remote node 60, as shown in FIG. 5. The node 60 of this embodiment is similar to the node 50 of the previous embodiment, with the following modifications. The same reference numbers are retained for corresponding features.

In this embodiment, the polarisation compensation apparatus comprises a polarisation compensator 62 arranged to rotate the polarisation of the further optical signal by 90° and to direct the optical seed signal back towards the optical router 56.

Figure 6:
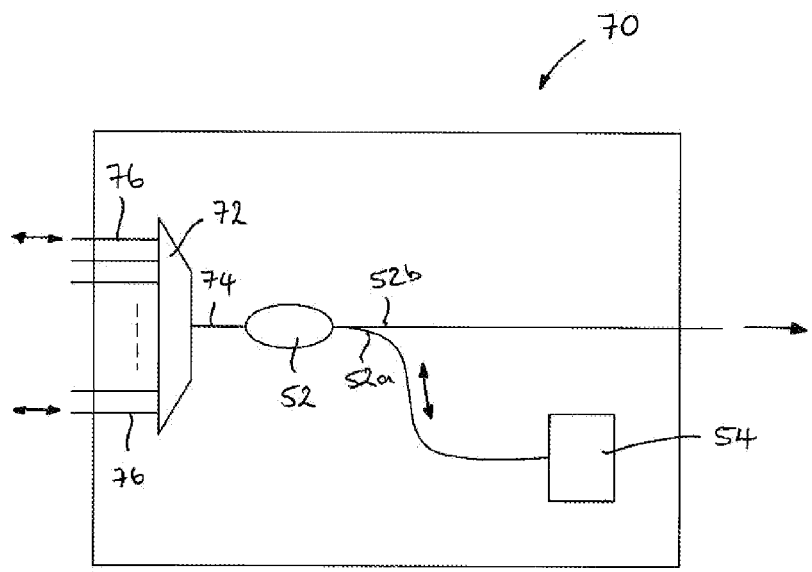
FIG. 6 is a schematic representation of a passive optical network remote node according to a sixth embodiment of the invention.

A PON remote node 70 according to a sixth embodiment of the invention is shown in FIG. 6. The node 70 of this embodiment is similar to the node 50 of FIG. 4, with the following modifications. The same reference numbers are retained for corresponding features.

In this embodiment the optical splitter comprises an optical coupler 52 and the optical router comprises an optical multiplexer/demultiplexer (MUX) 72. The MUX 72 comprises a first port 74 coupled to the optical splitter 52 and a plurality of further ports 76. Each of the further ports 76 is arranged to receive a respective upstream optical signal, each of which are routed to the first port 74 and received at the optical splitter 52. The optical splitter 52 is arranged to split off a part of each of the upstream optical signals to form respective further optical signals, output from first port 52a of the optical splitter. The remainder of each upstream optical signal is output at the second port 52b of the optical splitter. The FRM 54 is arranged to receive each further optical signal and to rotate a polarisation of each further optical signal, as described above, to form a respective optical seed signal. The optical seed signals are directed back to the optical splitter 52 and to the MUX 72, where they are routed to their respective ports 76 for onward downstream transmission.

Figure 7:
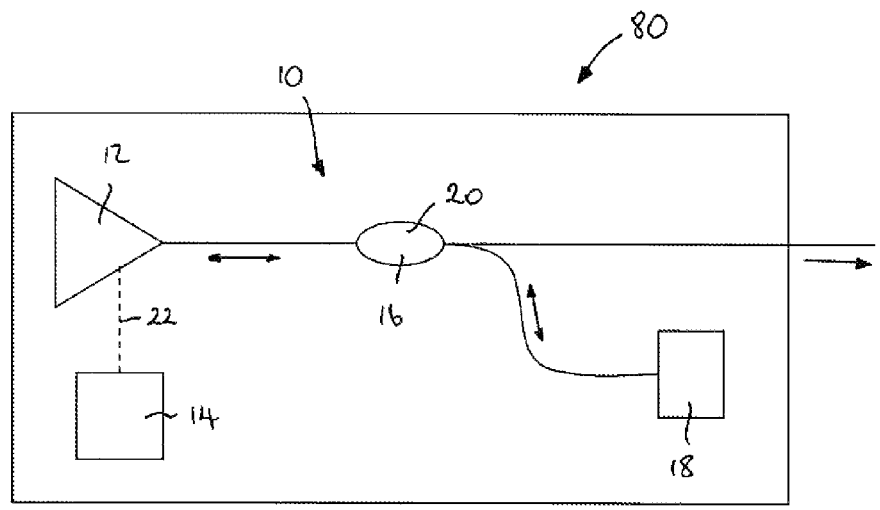
FIG. 7 is a schematic representation of an optical network element according to a seventh embodiment of the invention.

FIG. 7 shows an optical network element 80 according to a seventh embodiment of the invention. The optical network element 80 comprises an optical transmitter apparatus 10, as shown in FIG. 1.

Figure 8:
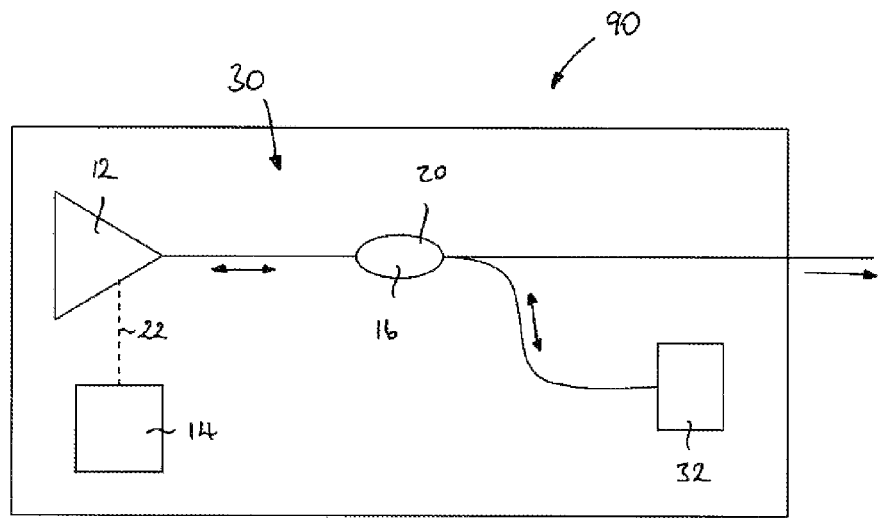
FIG. 8 is a schematic representation of an optical network element according to an eighth embodiment of the invention.

An eighth embodiment of the invention provides an optical network element 90, as shown in FIG. 8. The optical network element 90 comprises an optical transmitter apparatus 30 as shown in FIG. 2.

Figure 9:
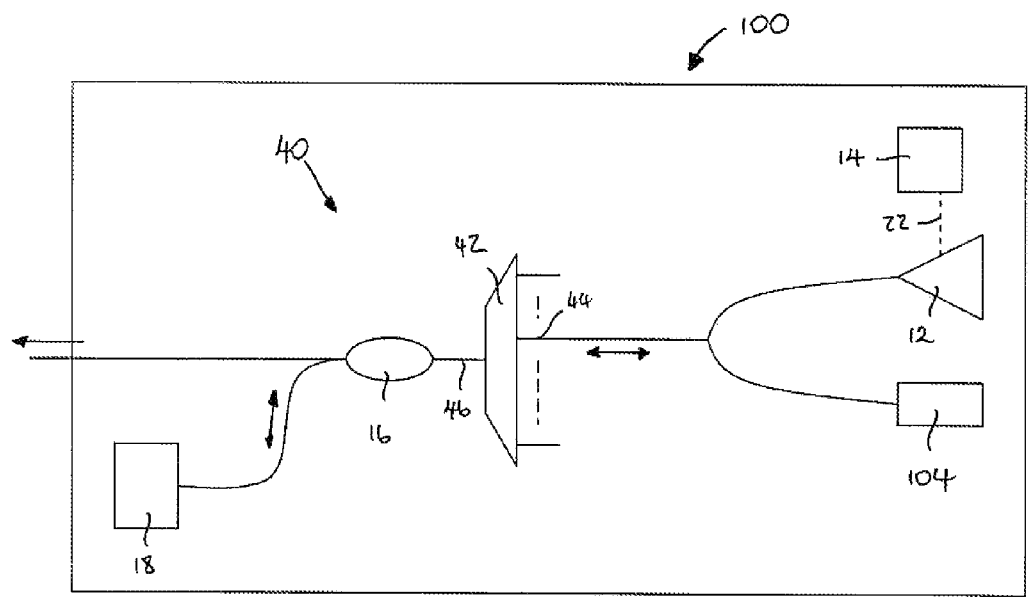
FIG. 9 is a schematic representation of an optical network element according to a ninth embodiment of the invention.

An optical network element 100 according to a ninth embodiment of the invention is shown in FIG. 9.

The optical network element 100 comprises optical transmitter apparatus 40 as shown in FIG. 3, with the following modifications. The same reference numbers are retained for corresponding features.

In this embodiment an optical receiver 104 is additionally coupled to each port 44 of the MUX 42.

Figure 10:
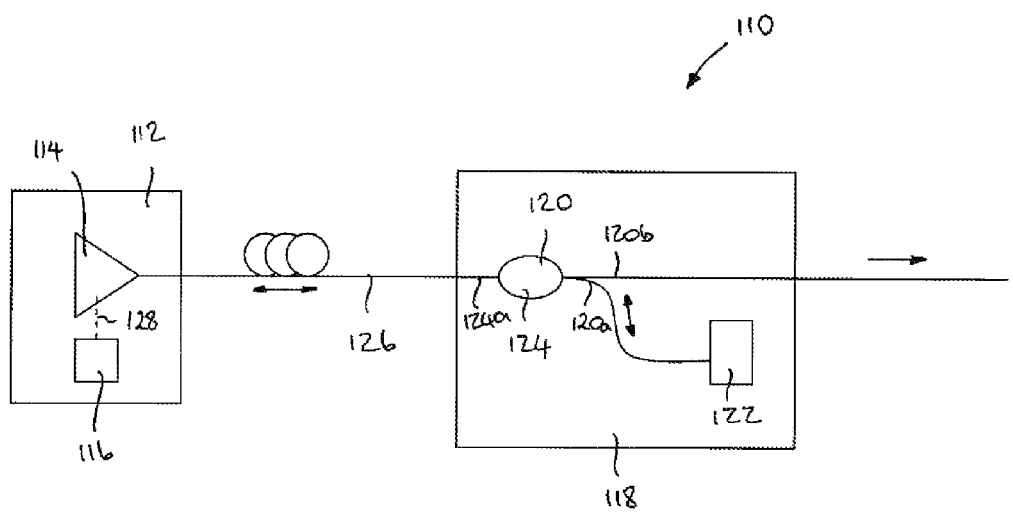
FIG. 10 is a schematic representation of a passive optical network according to a tenth embodiment of the invention.

A tenth embodiment of the invention provides a passive optical network (PON) 110, as shown in FIG. 10. The PON 110 comprises an optical network unit (ONU) 112, a remote node 118 and a drop fibre 126 coupled between the ONU 112 and the remote node 118.

The ONU 112 comprises a reflective optical amplifier 114 and a driver 116. The reflective optical amplifier 114 is arranged to receive an optical seed signal. The driver 116 is arranged to generate a drive signal 128 arranged to cause the reflective optical amplifier 114 to amplify the optical seed signal to form an optical signal.

The remote node 118 comprises an optical splitter 120, polarisation compensation apparatus 122, and an optical router 124. The optical splitter 120 is arranged to receive the optical signal from the ONU 112, and to split off a part of the optical signal to form a further optical signal. The further optical signal is delivered to a first port 120a of the optical splitter and the remainder of the optical signal is delivered to a second port 120b of the optical splitter. The polarisation compensation apparatus in this example comprises a faraday rotator mirror (FRM) 122. The FRM 122 is arranged to receive the further optical signal. The FRM is arranged to rotate the polarisation of the further optical signal by a pre-determined amount, as described above, to form a further optical seed signal. The optical router 124 is arranged to receive the further optical seed signal and to direct the further optical seed signal to the reflective optical amplifier 114. The output of the optical router 124a is coupled to the drop fibre 126, which delivers the further optical seed signal to the ONU 112 and the reflective optical amplifier 114.

Figure 11:
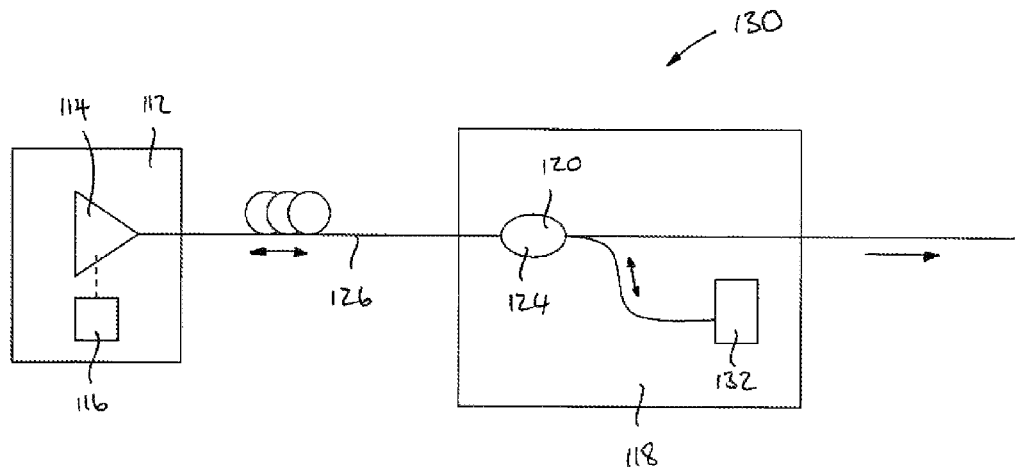
FIG. 11 is a schematic representation of a passive optical network according to an eleventh embodiment of the invention.

An eleventh embodiment of the invention provides a PON 130 as shown in FIG. 11. The PON 130 is similar to the PON 110 of FIG. 10, with the following modification. The same reference numbers are retained for corresponding features.

In this embodiment, the polarisation compensation apparatus comprises a polarisation compensator 132 arranged to rotate the polarisation of the further optical signal by 90 degrees.

Figure 12:
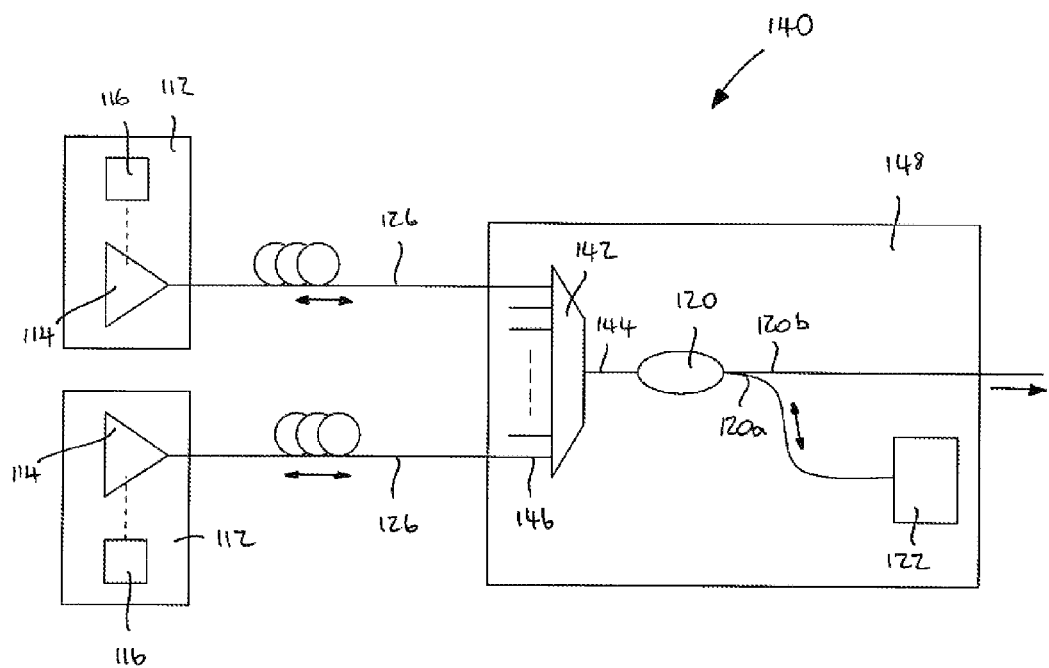
FIG. 12 is a schematic representation of a passive optical network according to a twelfth embodiment of the invention.

A twelfth embodiment of the invention provides a PON 140, as shown in FIG. 12. The PON 140 is similar to the PON 110 of FIG. 10, with the following modifications. The same reference number is retained for corresponding features.

In this embodiment, the optical splitter 120 comprises an optical coupler and the optical router comprises a multiplexer/demultiplexer (MUX) 142. The MUX 142 comprises a first port 144 which is coupled to the optical coupler 120 and a plurality of further ports 146.

The PON 140 comprises a said plurality of ONU's 112. Each ONU 112 is coupled to a respective further port 146 of the MUX 142 by a respective drop fibre 126. Each drop fibre 126 delivers a respective optical signal to the MUX 142 and the plurality of optical signals are delivered the optical coupler 120. The optical coupler 120 splits off a part of each optical signal to form a said plurality of further optical signals. The further optical signals are delivered to a first port 120a of the coupler 120 and the remaining part of each optical signal is delivered to a second port 120b of the optical coupler.

The FRM 122 is arranged to receive each further optical signal and to rotate the polarisation of each further optical signal and reflect each further optical signal, as described above, to form a further optical seed signal. The further optical seed signals are delivered to the MUX 142 where they are routed to their respective further port 146 and delivered via their respective drop fibres 126 to the respective ONU 112 and the respective reflective optical amplifier 114.

Figure 13:
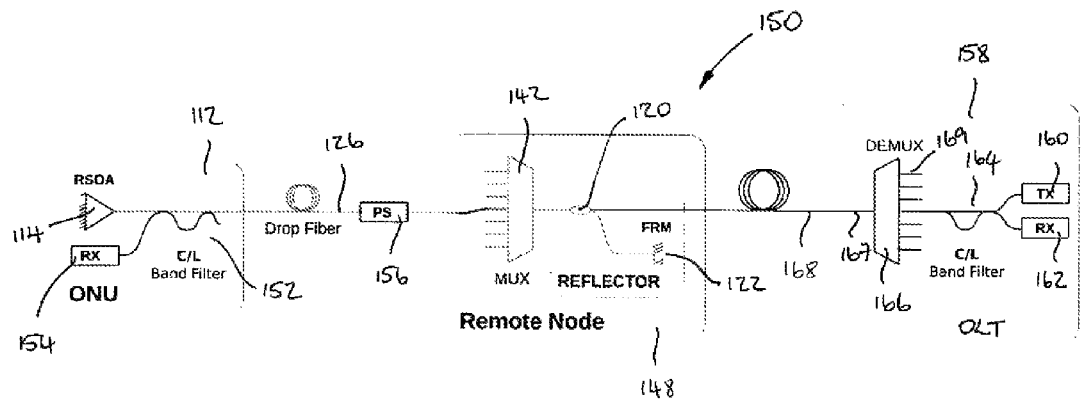
FIG. 13 is a schematic representation of an experimental set-up representing a passive optical network according to a thirteenth embodiment of the invention.

FIG. 13 shows an experimental set-up representing a PON 150 according to a thirteenth embodiment of the invention. The PON 150 is similar to the PON 140 of FIG. 12 with the following modifications. The same reference numbers are retained for corresponding features.

In this example, the reflective optical amplifier comprises a reflective semiconductor optical amplifier (RSOA) 114. The RSOA has a 3 dBm output saturation power, 20 dB small-signal gain and 2.5 dB unsaturated polarisation dependent gain. The driver 116 (not shown) is arranged to generate a drive signal comprising a 1.25 Gb/s NRZ PRBS $2^{31}$-1 sequence. The RSOA 104 has an output extinction ratio of 7 dB.

The ONU 112 additionally comprises a receiver 154 and a C/L band filter 152 arranged to separate downstream and upstream optical signals. The drop fibre 126 has a length of 1 km and is provided with a polarisation scrambler (PS) 156 arranged to emulate polarisation fluctuations. The polarisation scrambler 156 was driven to randomly change the sate of polarisation.

In this example, the MUX 142 comprises an arrayed wave guide grating (AWG) having 32 channels at 200 GHz channel spacing and a 4 dB insertion loss. The optical coupler 120 is 99:1 coupler arranged to split off 1% off an optical signal to form a further optical signal.

The PON 150 further comprises an optical line termination (OLT) 158. The OLT 158 is coupled to the remote node 148 by a feeder fibre 168, comprising 25 km of standard telecoms single mode fibre (SMF). The OLT 158 comprises a demultiplexer (DEMUX) 166, comprising a further AWG. The DEMUX 166 comprises a first port 167, coupled to the feeder fibre 168, and a plurality of further ports 169, each coupled to a transmitter 160 and a receiver 162 via second C/L band filter 164.

Figure 14:
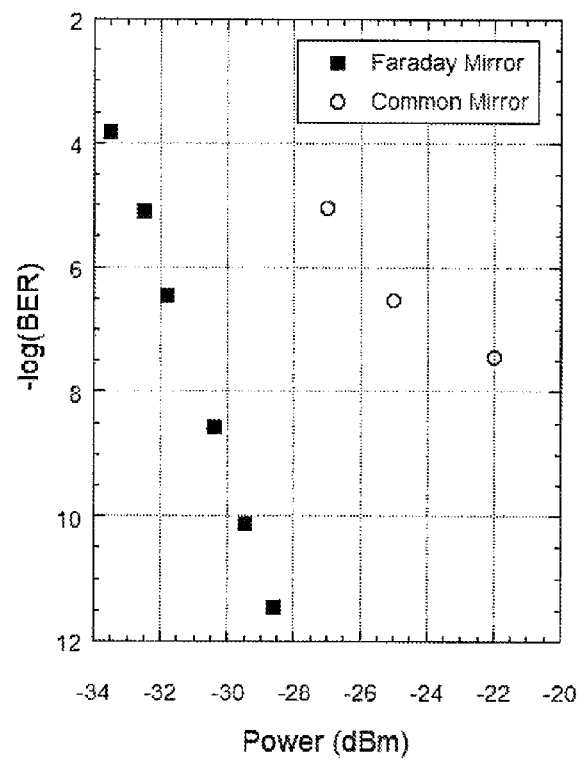
FIG. 14 shows a) (square data points) a graph of the bit error rate (BER) as a function of output power per channel (Power) for the passive optical network of FIG. 13 and b) (circular data points) the corresponding BER as a function of output power where the Faraday rotator mirror of FIG. 13 is replaced with a common mirror.

FIG. 14 shows the bit error rate (BER) as a function of output power per channel for the PON 150 in which the polarisation compensation apparatus comprises the FRM 122 (square data points). The polarisation scrambler was arranged to change the state of polarisation at frequency of 6 GHz.

The BER as a function of output channel power for the PON 150 with the FRM 122 replaced with a common mirror is shown for comparison (circular data points). It can be seen that a significantly lower BER is achieved when the PON 150 comprises the FRM 122.

Figure 15:
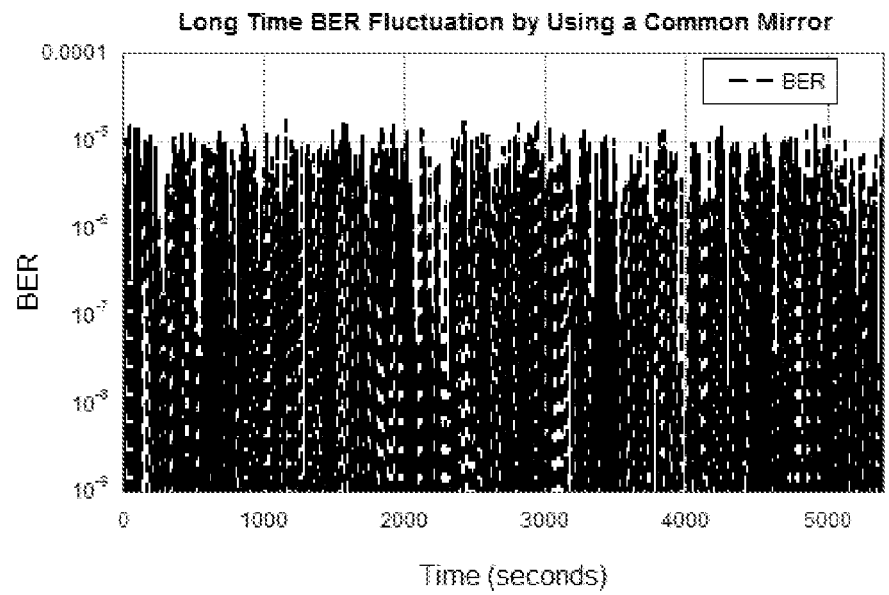
FIG. 15 shows the BER as a function of time for the passive optical network of FIG. 13 with the Faraday rotator mirror replaced with a common mirror.
Figure 16:
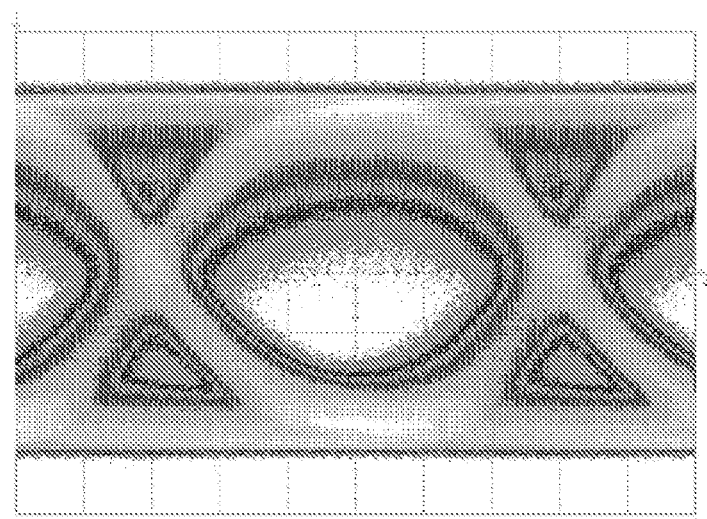
FIG. 16 shows an eye diagram for the passive optical network of FIG. 13 with the Faraday rotator mirror replaced with a common mirror.

FIG. 15 shows the BER as a function of time for the PON 150 having the FRM 122 replaced by a common mirror. FIG. 16 shows an eye-diagram for the PON 150 having the FRM 122 replaced with a common mirror.

Figure 17:
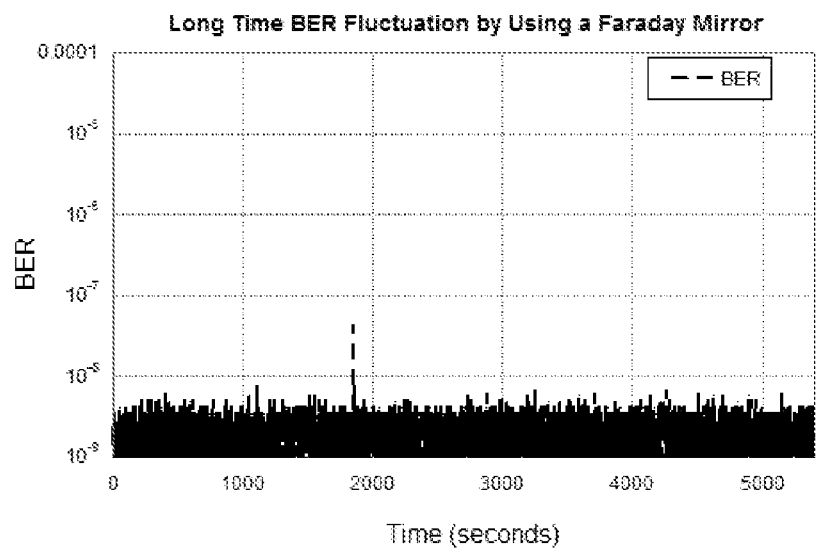
FIG. 17 shows the BER as a function of time for the passive optical network of FIG. 13.

FIG. 17 shows the BER as a function of time for the PON 150. As can be seen the BER is significantly improved for the PON 150 where the FRM 122 is used.

Figure 18:
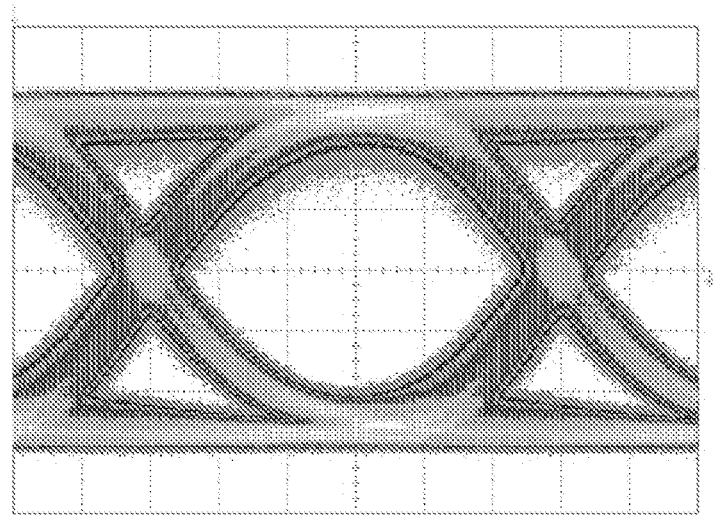
FIG. 18 shows an eye diagram for the passive optical network of FIG. 13.

FIG. 18 shows an eye-diagram for the PON 150. As can be seen, the eye-diagram is much more open than the eye-diagram of FIG. 16.

The optical transmitter apparatus, comprising the ONU 112, drop fibre 126 and remote node 148, may provide a self-tunable laser source for WDM-PON operations at very low cost. It works transparently across the C-band. It may solve the problem of power penalties associated with uncontrollable reflections generated through the feeder fibre. Every reflection may be beneficial to the self-seeding, and therefore improves the transmission performance. In other words in this PON 150 reflections become a positive side-effect.

Figure 19:
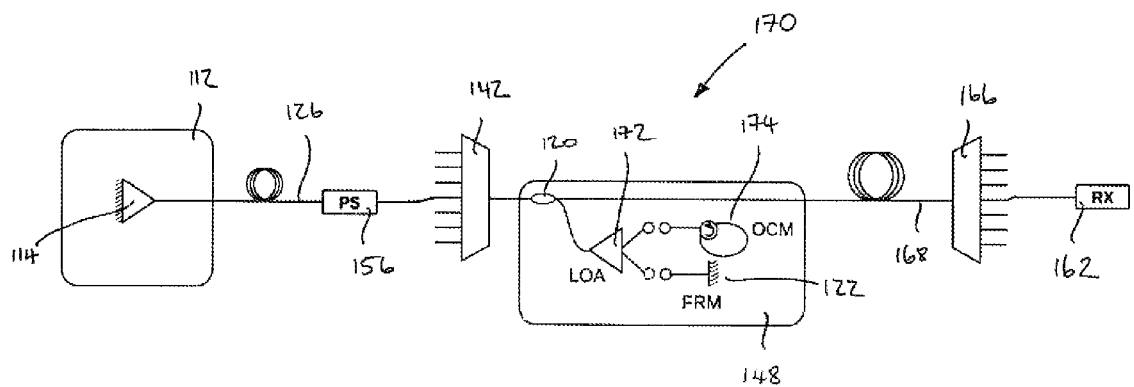
FIG. 19 is a schematic representation of an experimental set-up representing a passive optical network according to a fourteenth embodiment of the invention.

FIG. 19 shows an experimental set-up representing a PON 170 according to a fourteenth embodiment of the invention. The PON 170 is similar to the PON 150 of FIG. 13, with the following modifications. The same reference numbers are retained for corresponding features.

In this embodiment, the polarisation compensation apparatus further comprises an optical amplifier 172 arranged to amplify each further optical signal as it is transmitted to the FRM 122 and to amplify the further optical seed signal as it is transmitted back to the coupler 120. In this example the optical amplifier 172 comprises a linear semiconductor optical amplifier (LOA). The LOA 172 was biased at 130 mA, providing 10 dB single path small-signal again, with 1 dB polarisation dependent gain. The 3 dB gain bandwidth of the LOA was 50 nm around 1535 nm. The FRM 122 in this example provided 90°+/−1° polarisation rotation over a bandwidth of 30 nm around 1550 nm.

The remote node 148 further comprised an optical circulator mirror (OCM) 174 to act as a conventional mirror for comparison.

Figure 20:
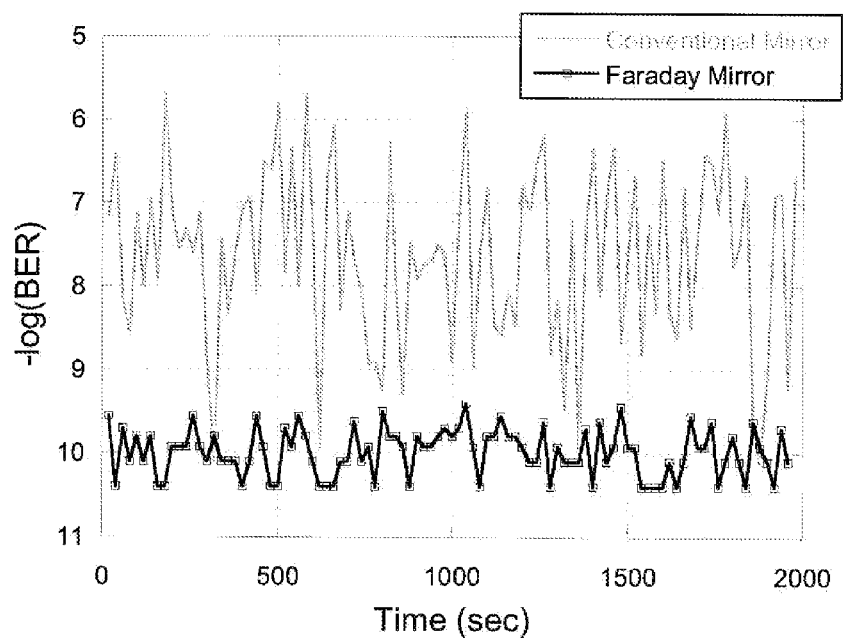
FIG. 20 shows a) (square data points) a graph of the bit error rate (BER) as a function of output power per channel (Received Power) for the passive optical network of FIG. 19 in a back-to-back configuration and b) (circular data points) the corresponding BER as a function of output power after propagation along the feeder fibre.

FIG. 20 shows the BER as a function of time for the PON 170 comprising the OCM 174 (conventional mirror) (circular data points) and the FRM 122 (square data points). It can be seen that the FRM 122 results in the PON 170 having significantly lower BER and lower BER fluctuations. Using the FRM 122, the BER of the PON 170 remains relatively stable around a value of $10^{-10}$, with an average of $1.2 \times 10^{-10}$. These measurements were performed at constant optical power of −31 dBm corresponding to the sensitivity of the receiver sent to the receiver 162. The results clearly show that the FRM 122 provides stable and robust self-seeding in a realistic environment.

Figure 21:
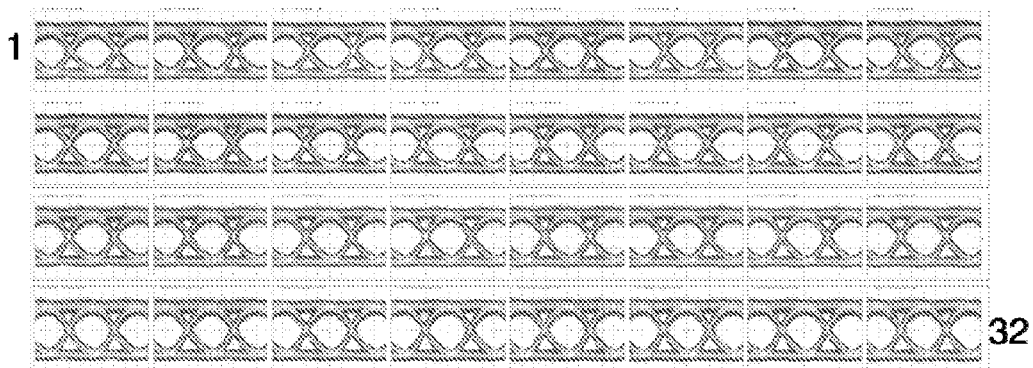
FIG. 21 shows eye diagrams for 32 WDM channels in the C-band propagating across the passive optical network of FIG. 19 (top left: channel wavelength is 1535.2 nm; bottom right: channel wavelength is 1559.78 nm)
Figure 23:
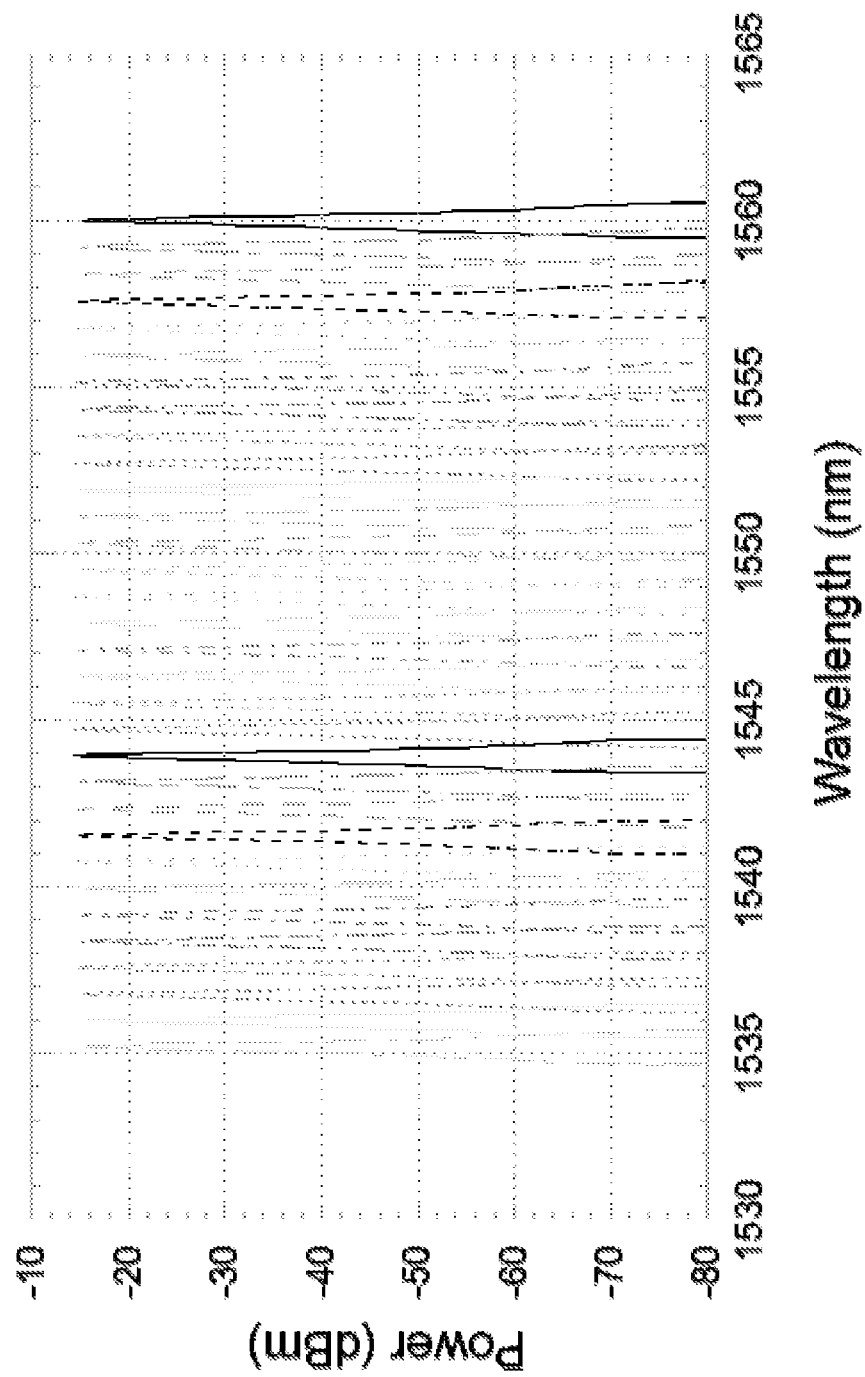
FIG. 23 shows the optical spectra of the WDM channels of FIG. 23.

FIG. 21 shows eye-diagrams for each of 32 wavelength channels of the MUX 142. The 32 channels have a channel spacing of 200 GHz within the C-band. FIG. 23 shows the spectral profiles of each of the 32 channels. The eye-diagrams verify that self-seeding occurs at 32 different wavelengths across the C-band. This is important because the FRM performs exact 90° rotation at 1550 nm.

Figure 22:
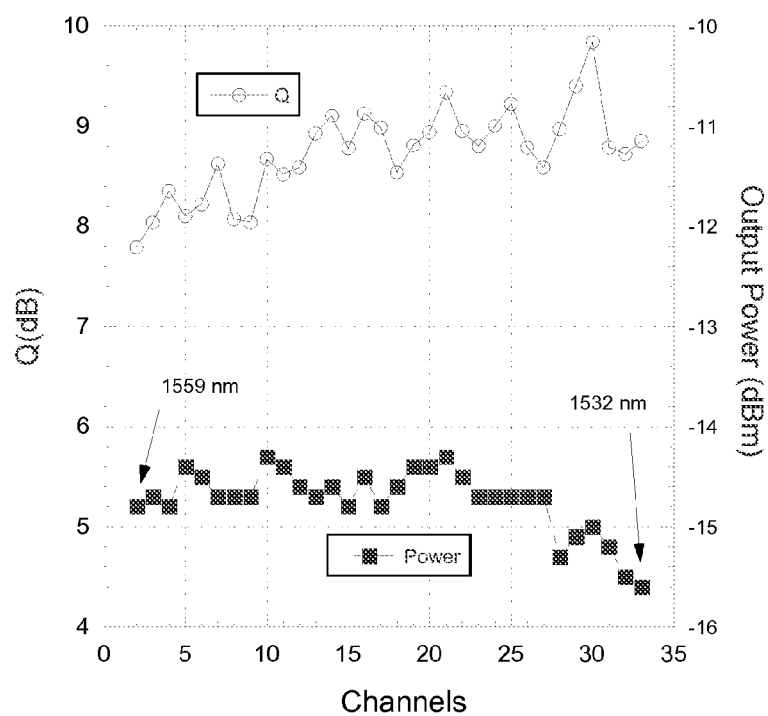
FIG. 22 shows a) (square data points) the output power and b) quality (Q) (circular data points) for each of the 32 channels of FIG. 23.

FIG. 22 shows the Q-factor (circular data points) and the output power (square data points) for each of the 32 channels.

As can be seen from FIGS. 21 and 22, the PON 170 produced extremely wide open eye-diagrams for each of the 32 channels with Q-factors larger than 8 dB and average output power of −14 dBm.

Figure 24:
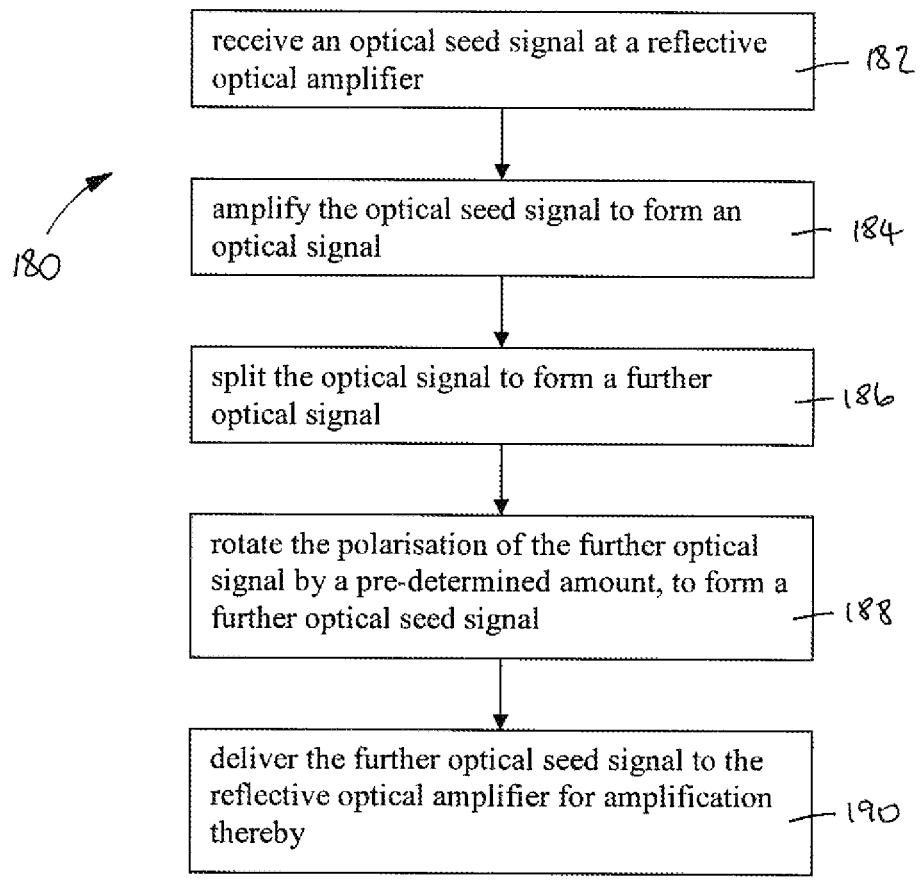
FIG. 24 shows the steps of a method of forming an optical signal according to a fifteenth embodiment of the invention.

FIG. 24 shows the steps of a method 180 of forming an optical signal according to a fifteenth embodiment of the invention.

The method 180 comprises receiving an optical seed signal at a reflective optical amplifier 182. The optical seed signal is then amplified to form an optical signal 184. The optical signal is split to form a further optical signal 186. The remaining part of the optical signal forms the optical signal. The polarisation of the further optical signal is rotated by a predetermined amount, to form a further optical seed signal 188. The further optical seed signal is delivered to the reflective optical amplifier for amplification thereby 190. Another optical signal is thereby formed and the method steps repeat.

Figure 25:
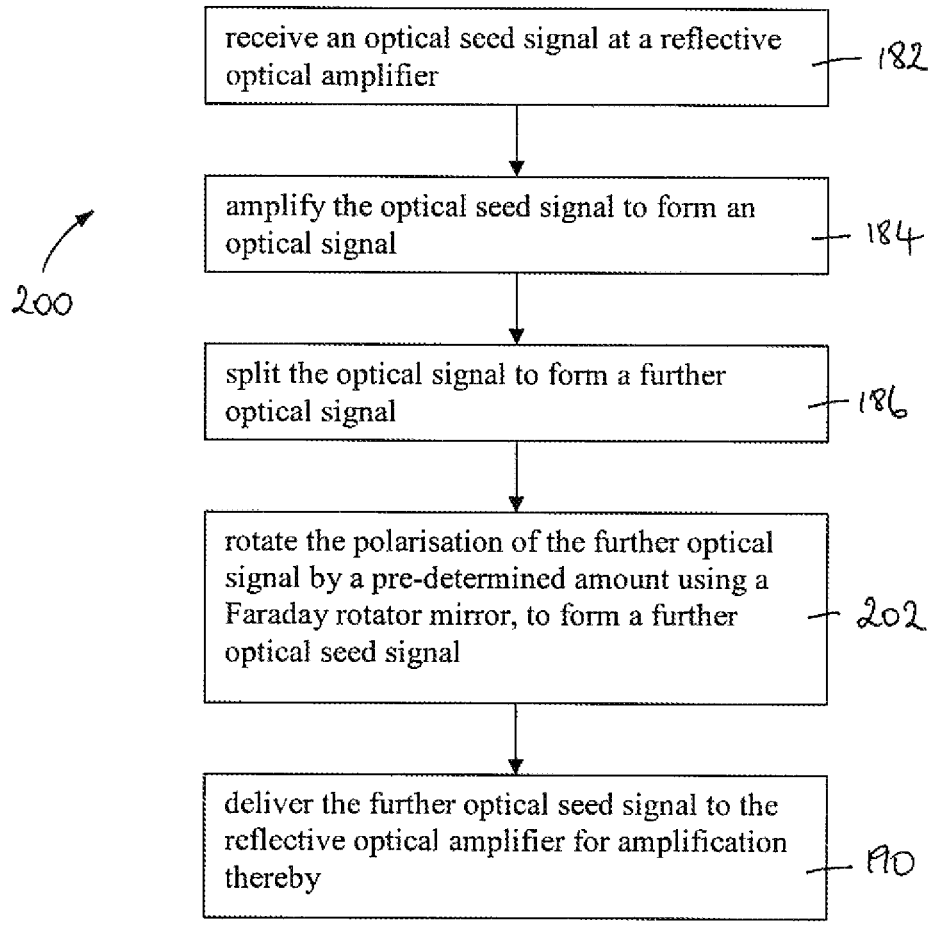
FIG. 25 shows the steps of a method of forming an optical signal according to a sixteenth embodiment of the invention.

FIG. 25 shows the steps of a method 200 of forming an optical signal according to a sixteenth embodiment of the invention.

The method 200 is similar to the method 180 of FIG. 24, with the following modifications. The same reference numbers are retained for corresponding steps.

In this embodiment, the polarisation of the further optical signal is rotated using a Faraday rotor mirror, to form the further optical seed signal 202. As will be well know to the person skilled in the art, a Faraday rotator mirror comprises a Faraday rotator and a mirror. Transmission of the further optical signal through the Faraday rotator causes the polarisation of the further optical signal to be rotated by 45°, the mirror then reflects the further optical signal and the polarisation is rotated by a further 45° on retransmission through the Faraday rotator, to form the further optical seed signal.

Figure 26:
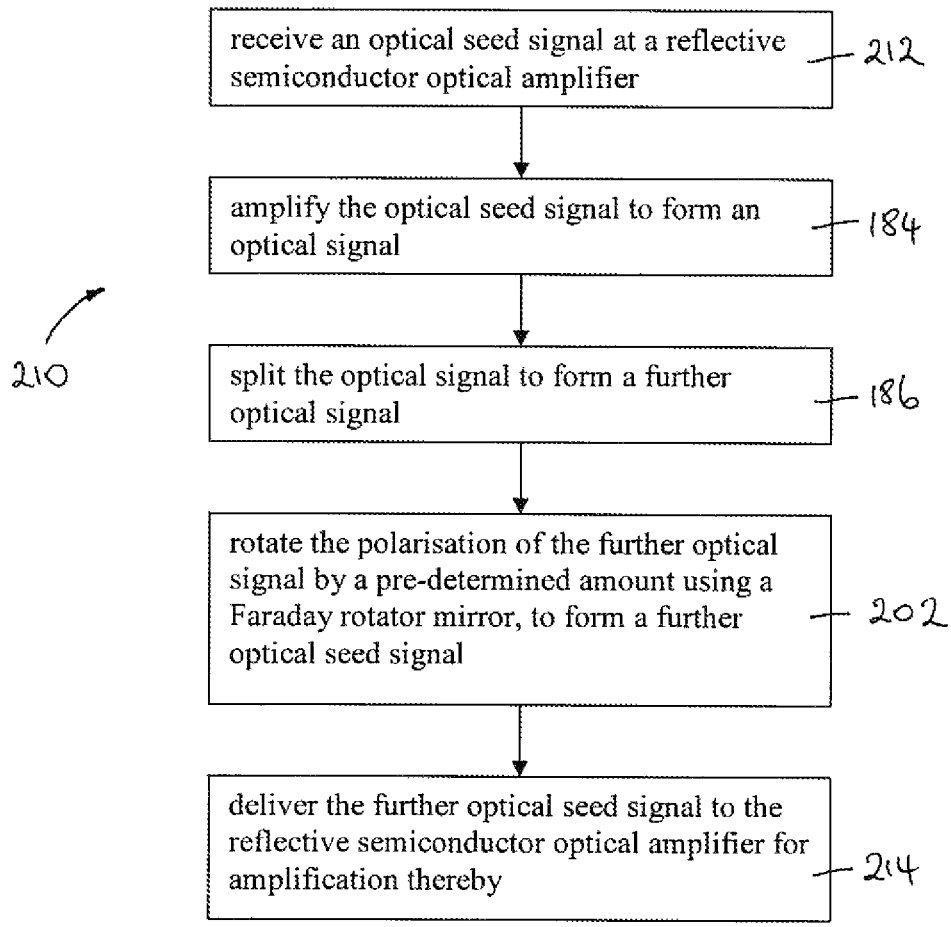
FIG. 26 shows the steps of a method of forming an optical signal according to a seventeenth embodiment of the invention.

FIG. 26 shows the steps of a method 210 of forming an optical signal according to a seventeenth embodiment of the invention.

The method 210 is similar to the method 200 of FIG. 25, with the following modifications. The same reference numbers are retained for corresponding steps.

In this embodiment, the reflective optical amplifier comprises a reflective semiconductor amplifier 212, 214.

Figure 27:
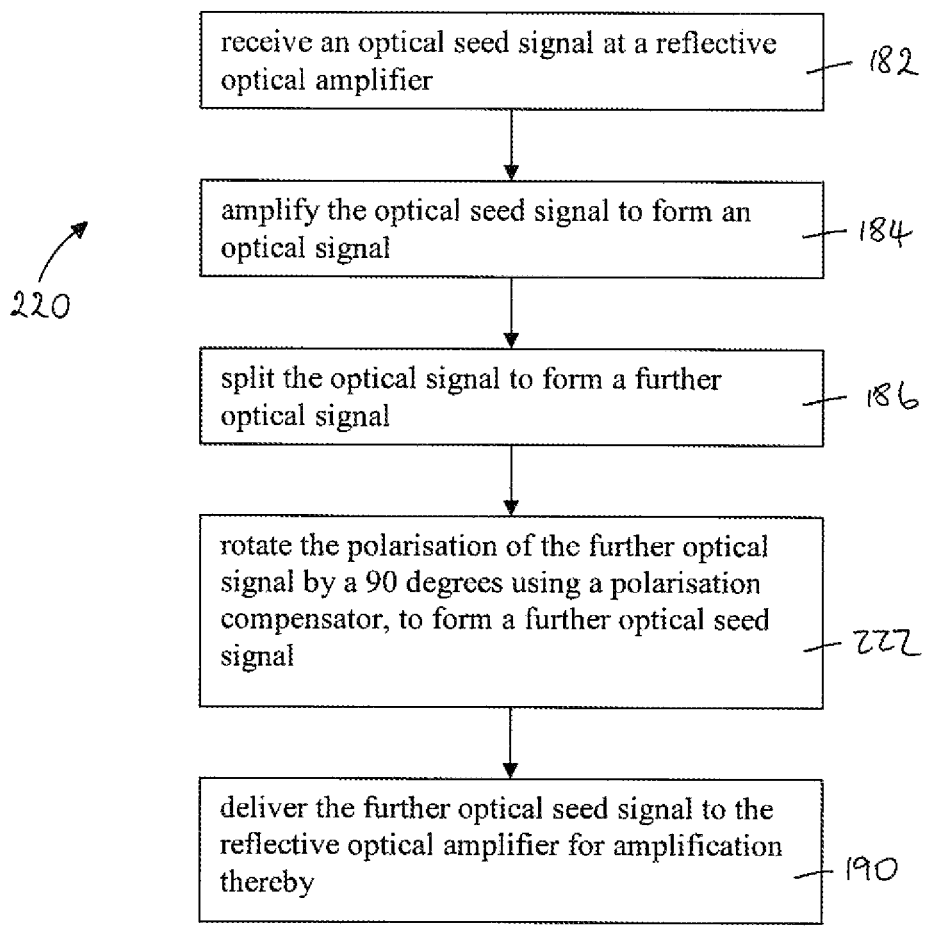
FIG. 27 shows the steps of a method of forming an optical signal according to an eighteenth embodiment of the invention.

FIG. 27 shows the steps of a method 220 of forming an optical signal according to an eighteenth embodiment of the invention.

The method 220 is similar to the method 180 of FIG. 24, with the following modifications. The same reference numbers are retained for corresponding steps.

In this embodiment, the polarisation of the further optical signal is rotated using a polarisation compensator, to form the further optical seed signal 222.

A nineteenth embodiment of the invention provides a data carrier having computer readable instructions embodied therein. The said computer readable instructions are for providing access to resources available on a processor. The computer readable instructions comprise instructions to cause the processor to perform the steps of the method 180 of forming an optical signal.

The invention claimed is:
1. Optical transmitter apparatus comprising:
a reflective optical amplifier arranged to receive an optical seed signal;
a driver arranged to generate a drive signal arranged to cause the reflective optical amplifier to amplify the optical seed signal to form an optical signal;

an optical splitter arranged to receive the optical signal and to split off a part of the optical signal to form a further optical signal;

polarisation compensation apparatus arranged to receive the further optical signal and being further arranged to rotate a polarisation of the further optical signal by a pre-determined amount, to form a further optical seed signal, the further optical seed signal having an orthogonal polarization state to the further optical signal; and an optical router arranged to receive the further optical seed signal and to direct the further optical seed signal to the reflective optical amplifier for amplification thereby; and the reflective optical amplifier arranged to receive the further optical seed signal having an orthogonal polarization state to the further optical signal.

2. Optical transmitter apparatus as claimed in claim 1, wherein the polarisation compensation apparatus comprises a Faraday rotator mirror.

3. Optical transmitter apparatus as claimed in claim 1, wherein the polarisation compensation apparatus comprises a polarisation compensator arranged to rotate the polarisation by 90 degrees.

4. Optical transmitter apparatus as claimed in claim 1, wherein the optical router comprises an optical multiplexer/demultiplexer comprising a plurality of ports and the optical transmitter apparatus comprises: a plurality of reflective optical amplifiers each coupled to a respective port, each reflective optical amplifier being arranged to receive a respective optical seed signal; and a plurality of drivers each arranged to generate a respective drive signal arranged to cause the respective reflective optical amplifier to amplify the respective optical seed signal to form a respective optical signal.

5. An optical network element comprising optical transmitter apparatus as claimed in claim 1.

6. A passive optical network remote node comprising:

an optical splitter arranged to receive an upstream optical signal and to split off a part of the optical signal to form a further optical signal;

polarisation compensation apparatus arranged to receive the further optical signal and being further arranged to rotate a polarisation of the further optical signal by a pre-determined amount, to form an optical seed signal, the optical seed signal having an orthogonal polarization state to the optical signal;

an optical output; and an optical router arranged to receive the optical seed signal and to route the optical seed signal to the optical output, the optical output coupled to a drop fibre configured to deliver the optical seed signal to a reflective optical amplifier arranged to receive the optical seed signal having an orthogonal polarization state to the optical signal.

7. A passive optical network remote node as claimed in claim 6, wherein the polarisation compensation apparatus comprises a Faraday rotator mirror.

8. A passive optical network remote node as claimed in claim 6, wherein the polarisation compensation apparatus comprises a polarisation compensator arranged to rotate the polarisation by 90 degrees.

9. A passive optical network remote node as claimed in claim 6, wherein the optical splitter is arranged to receive a plurality of upstream optical signals and to split off a part of each said optical signal to form a respective further optical signal, the polarisation compensation apparatus is arranged to receive each further optical signal and is further arranged to rotate a polarisation of each further optical signal by a pre-determined amount, to form a respective optical seed signal, and the optical router comprises an optical multiplexer/demultiplexer comprising a first port coupled to the optical splitter and a plurality of further ports, each further port being arranged to deliver a respective optical seed signal.

10. A passive optical network comprising:

an optical network unit comprising:
a reflective optical amplifier arranged to receive an optical seed signal;
a driver arranged to generate a drive signal arranged to cause the reflective optical amplifier to amplify the optical seed signal to form an optical signal;

a remote node comprising:
an optical splitter arranged to receive the optical signal and to split off a part of the optical signal to form a further optical signal;
polarisation compensation apparatus arranged to receive the further optical signal and being further arranged to rotate a polarisation of the further optical signal by a pre-determined amount, to form a further optical seed signal, the further optical seed signal having an orthogonal polarization state to the further optical signal;
an optical router arranged to receive the further optical seed signal and to direct the further optical seed signal to the reflective optical amplifier; and,
the reflective optical amplifier arranged to receive the further optical seed signal having an orthogonal polarization state to the further optical signal; and a drop fibre coupled between the optical network unit and the remote node.

11. A passive optical network as claimed in claim 10, wherein the passive optical network comprises a plurality of optical network units and a plurality of drop fibres coupled between the remote node and each respective optical network unit.

12. A passive optical network as claimed in claim 10, wherein the polarisation compensation apparatus comprises a Faraday rotator mirror.

13. A passive optical network as claimed in claim 10, wherein the polarisation compensation apparatus comprises a polarisation compensator arranged to rotate the polarisation by 90 degrees.

14. A passive optical network as claimed in claim 11, wherein the optical splitter is arranged to receive a plurality of optical signals and to split off a part of each said optical signal to form a respective further optical signal, the polarisation compensation apparatus is arranged to receive each further optical signal and is further arranged to rotate a polarisation of each further optical signal by a pre-determined amount, to form a respective further optical seed signal, and the optical router comprises an optical multiplexer/demultiplexer comprising a first port coupled to the optical splitter and a plurality of further ports, each further port being arranged to direct a respective further optical seed signal to the respective reflective optical amplifier.

15. A method of forming an optical signal, the method comprising:

receiving an optical seed signal at a reflective optical amplifier;
amplifying the optical seed signal to form an optical signal;
splitting the optical signal to form a further optical signal;
rotating the polarisation of the further optical signal by a pre-determined amount, to form a further optical seed signal, the further optical seed signal having an orthogonal polarization state to the further optical signal; and delivering the further optical seed signal to the reflective optical amplifier for amplification thereby, the reflective optical amplifier arranged to receive the further optical seed signal having an orthogonal polarization state to the further optical signal.

16. A method as claimed in claim 15, wherein the polarisation is rotated by a Faraday rotator mirror.

17. A method as claimed in claim 15, wherein the polarisation is rotated by a polarisation compensator arranged to rotate the polarisation by 90 degrees.

* * * * *